(12) United States Patent
Sun

(10) Patent No.: US 11,712,755 B2
(45) Date of Patent: Aug. 1, 2023

(54) METHOD FOR WORKPIECE PROCESSING AND CUTTER MANUFACTURING USING A LASER

(71) Applicant: SHANGHAI NAGOYA PRECISION TOOLS CO., LTD., Shanghai (CN)

(72) Inventor: Si-Rui Sun, Shanghai (CN)

(73) Assignee: SHANGHAI NAGOYA PRECISION TOOLS CO., LTD., Shanghai (CN)

( * ) Notice: Subject to any disclaimer, the term of this patent is extended or adjusted under 35 U.S.C. 154(b) by 17 days.

(21) Appl. No.: 16/767,414

(22) PCT Filed: Mar. 28, 2019

(86) PCT No.: PCT/CN2019/080274
§ 371 (c)(1),
(2) Date: May 27, 2020

(87) PCT Pub. No.: WO2019/185002
PCT Pub. Date: Oct. 3, 2019

(65) Prior Publication Data
US 2020/0384576 A1    Dec. 10, 2020

(30) Foreign Application Priority Data

Mar. 29, 2018 (CN) .......................... 201810274677.2

(51) Int. Cl.
*B23K 26/38* (2014.01)
*B23K 26/0622* (2014.01)
(Continued)

(52) U.S. Cl.
CPC .......... *B23K 26/38* (2013.01); *B23K 26/0622* (2015.10); *B23K 26/0884* (2013.01); *B23K 2101/002* (2018.08); *B23K 2103/16* (2018.08)

(58) Field of Classification Search
CPC .......... B23K 2101/002; B23K 2101/20; B23K 2103/52; B23K 26/0622; B23K 26/08; B23K 26/0884; B23K 26/38; B23K 26/402; B23K 2103/16; B23K 26/36; B23K 26/364; C08F 210/14; C08F 210/16; C08F 2420/01; C08F 2500/04; C08F 2500/05; C08F 2500/12; C08F 4/63904;
(Continued)

(56) References Cited

U.S. PATENT DOCUMENTS

2017/0113304 A1* 4/2017 Pluss ..................... B23K 26/40
2019/0232420 A1* 8/2019 Kondameedi .......... B23K 26/38

\* cited by examiner

*Primary Examiner* — William J Levicky
*Assistant Examiner* — Adam M Eckardt
(74) *Attorney, Agent, or Firm* — WPAT, P.C

(57) ABSTRACT

A laser cutting method includes a step of determining a material to be removed and dividing the material to be removed into a plurality of material chips so as thereby to organize a machining plan for laser cutting; and, a step of, according to the machining plan for laser cutting, moving a laser along a boundary defining the material to be removed on the workpiece to perform cutting in a first direction and a second direction, such that the material chips can be separated from the workpiece orderly piece by piece so as to form a specific pattern. While in laser cutting, the method removes the material piece by piece. With the laser to remove the material chips through cutting along the boundary, the pattern on the workpiece is thus finished equivalently by the laser. Thereupon, the machining time can be significantly reduced.

16 Claims, 4 Drawing Sheets

(51) Int. Cl.
*B23K 26/08* (2014.01)
*B23K 103/16* (2006.01)
*B23K 101/00* (2006.01)

(58) Field of Classification Search
CPC .............. C08F 4/63912; C08F 4/63916; C08F 4/6392; C08F 4/65927; C08F 10/00
See application file for complete search history.

METHOD FOR WORKPIECE PROCESSING AND CUTTER MANUFACTURING USING A LASER

CROSS REFERENCE TO RELATED APPLICATION

This application claims the benefits of China application Serial No. 201810274677.2, filed Mar. 29, 2018, the disclosures of which are incorporated by references herein in its entirety.

TECHNICAL FIELD

The present disclosure relates in general to a workpiece processing method, and more particularly to a machining method applying a laser for material cutting so as to form a demanded pattern such as a curve surface, a groove, a hole and so on. In addition, while this disclosed method is applied to manufacture a cutter made of a PCD, a CBN, a hard metallic alloy, a ceramic material and a metallized ceramic material and so on, an expected portion thereof can be precisely obtained.

BACKGROUND

In the art, cutters made of polycrystalline diamond (PCD) or cubic boron nitride (CBN) provides resolutions for machining difficult-to-machine materials.

The CBN or polycrystalline CBN (PCBN) is a synthesized material with a hardness second to the diamond and a well high-temperature stability (high temperatures are always induced while in machining hardened ferrous metals or super alloys). Currently, various CBN cutters have been widely applied to machine the hardened ferrous metals in a continuous or batch processing manner, and also to machine welding or composite metals.

In addition, a typical PCD cutter is formed by welding a PCD material onto a cutter body made of another base material. Generally, the PCD material and the cutter body are sintered together via a metal-based binder at a pressured high temperature environment, such that the diamond granules can be "fixed" to the cutter body for further being processed to for a PCD cutting edge. Alternatively, the PCD cutting edge can be machine by electric discharge machining or laser machining, and then the machined cutting edge is welded to a base material made of a hard alloy or steel. Then, the assembly of the base material and the machined cutting edge is polished to form the PCD cutter. This type of cutters is especially suitable to machine color metals (aluminum for example), high abrasive synthetic materials and plastics at a higher speed. Currently, the PCD cutters are widely applied in milling color metals, composite materials, plastics and super alloys extremely hard to machine.

Due to properties of PCD and CBN, ordinary polishing is definitely not a good choice for patterning the PCD or CBN cutter, especially an entire spiral cutting tool. Conventionally, such a spiral cutting tool is generally produced by abutting a plurality of adhesive cutter chips in a discontinuous manner.

On the other hand, an alternative for producing the PCD or CBN cutter is the electric erosion. Through a copper-wheel electrode cathode to "machine" a cutter material as an anode dipped in a solution, then the PCD or CBN cutter can be obtained through this electric abrading process. However, this process costs not only the time but the expense, and the coarseness thereof is not controllable, such that the surface clearness and smoothness would be away from machining requirements.

Based on the aforesaid electric erosion, an improvement introduces firstly a large electric current to perform the erosion, and then stepwise descending electric currents are applied to improve the surface finish. Thereupon, though the machining quality can be improved, yet the entire efficiency is reduced. In addition, the surface finish of the electric-eroded workpiece can never catch up that of a polished workpiece.

Thus, a third resort other than the foregoing two is developed. In this effort, a sand wheel specifically designed for the PCD or CBN workpiece is introduced to perform groove-forming, from which a satisfied finish can be obtained. In particular, this sand wheel can be paired with a special electric device so as to integrate the electric erosion as a secondary machining means. Thereby, machining performance that can be achieved upon processing the PCD or CBN material for patterning the required functional portions would be much improved.

SUMMARY

An object of the present disclosure is to provide a method for processing a workpiece with a laser. According to demands in forming functional portions, the laser is applied for machining and thus improving process efficiency.

Another object of this present disclosure is to provide a laser method for manufacturing a cutter, especially the cutter made of a hard material. Thereupon, process efficiency in patterning the functional portions of the cutter can be significantly enhanced.

A further object of this present disclosure is to provide a method for producing a cutter, especially the cutter made of a PCD or CBN material. Thereupon, machining efficiency in patterning the functional portions of the cutter can be significantly enhanced.

In one aspect of this disclosure, a method for processing a workpiece with a laser includes the steps of:

(a) determining a pattern to be machined on a workpiece and further a cutting boundary to define the pattern to be machined on the workpiece so as to decide a material to be removed;

(b) dividing the material to be removed into a plurality of material chips, and generating a machining plan for laser cutting according to boundaries of the plurality of material chips at the pattern to be machined; and (c) according to the machining plan for laser cutting, applying a laser to cut the workpiece along the boundaries to remove orderly each of the plurality of material chips away from the workpiece;

wherein the biggest size of the plurality of material chips is determined by a machinable depth of the workpiece with respect to the laser, and the machinable depth is the farthest distance that the laser reaches into the workpiece along an optical path of the laser; and, wherein the machinable depth of the laser is less than a thickness of the workpiece at a location thereof receiving the laser.

In this embodiment, the workpiece can be made of, but not limited to, one of a PCD, a CBN, a hard metal, a ceramic material and a metallized ceramic material, and can be shaped to, but not limited to, be one of a sphere, a cylinder, a tapered body, a plate and a block.

In this embodiment, the method is applicable for machining a cutter, especially for patterning functional portions on the cutter made of a hard material.

In another aspect of this disclosure, a method for producing a cutter includes the steps of:

(1) setting up machining parameters of each of a plurality of functional portions, and generating a cutting boundary to define each of the plurality of functional portions on the workpiece so as to decide a corresponding material to be removed;

(2) dividing the material to be removed into a plurality of material chips, and generating a machining plan for laser cutting according to boundaries of the plurality of material chips at the pattern to be machined; and (3) according to the machining plan for laser cutting, applying a laser to cut the workpiece along the boundaries to remove orderly each of the plurality of material chips away from the workpiece so as to form corresponding one of the plurality of functional portion.

In this embodiment, the functional portions include, but not limited to, a chip-leading groove, a spiral groove, a rake face or a flank face. In addition, a machinable depth of the laser is less than a thickness of the workpiece at a location thereof receiving the laser.

In a further aspect of this disclosure, a method for producing a spiral groove includes the steps of:

(i) setting up parameters of a spiral groove of a cutter (such as, but not limited to, a rake angle, a clearance angle, a core thickness, a blade width ratio, a groove-bottom arc, a helix angle and a tool cutting edge inclination), and generating a cutting boundary to define the spiral groove on a workpiece so as to obtain a corresponding material to be removed;

(ii) dividing the material to be removed into a plurality of material chips, and generating a machining plan for laser cutting according to boundaries of the plurality of material chips at a pattern to be machined; and (iii) according to the machining plan for laser cutting, applying a laser to cut the workpiece along the boundaries to remove orderly each of the plurality of material chips away from the workpiece so as to form the spiral groove;

wherein a machinable depth of the laser is less than a thickness of the workpiece at the spiral groove thereof receiving the laser.

In order to improve automation of the method provided by this disclosure, a three-axis or multi-axis linkage processing equipment can be controlled by a computer to perform laser cutting for manufacturing functional portions.

In a furthermore aspect of this disclosure, a method for producing a cutter, applied in a five-axis linkage processing equipment, includes the steps of:

(a) setting up parameters of a functional portion of a cutter (such as, but not limited to, a rake angle, a clearance angle, a core thickness, a blade width ratio, a groove-bottom arc, a helix angle and a tool cutting edge inclination), and generating a cutting boundary to define the functional portion on a workpiece so as to obtain a corresponding material to be removed and digitalized information;

(b) dividing the material to be removed into a plurality of material chips, and generating a digitalized machining plan for laser cutting according to boundaries of the plurality of material chips at a pattern to be machined; and (c) according to the digitalized machining plan for laser cutting, applying a computer to control a laser to cut the workpiece along the boundaries to remove orderly each of the plurality of material chips away from the workpiece so as to form the functional portion, and a machinable depth of the laser is less than a thickness of the workpiece at the functional portion thereof receiving the laser.

In a one more aspect of this disclosure, a method for producing a spiral groove of a cutter, applied in a five-axis linkage processing equipment, includes the steps of:

(1) setting up parameters of the spiral groove (such as, but not limited to, a rake angle, a clearance angle, a core thickness, a blade width ratio, a groove-bottom arc, a helix angle and a tool cutting edge inclination), and generating a cutting boundary to define the spiral groove on a workpiece so as to obtain a corresponding material to be removed and digitalized information;

(2) dividing the material to be removed into a plurality of material chips, and generating a digitalized machining plan for laser cutting according to boundaries of the plurality of material chips at a pattern to be machined; and (3) according to the digitalized machining plan for laser cutting, applying a computer to control a laser to cut the workpiece along the boundaries to remove orderly each of the plurality of material chips away from the workpiece so as to form the spiral groove, and a machinable depth of the laser is less than a thickness of the workpiece at the spiral groove thereof receiving the laser.

In the method of this disclosure, the material to be removed is made of, but not limited to, one of a PCD, a CBN, a hard metal, a ceramic material and a metallized ceramic material.

In the method of this disclosure, the laser is one of a pulse laser and a continuous laser.

By applying this disclosure, following advantages can be obtained.

In comparison with the conventional electric erosion or polishing method, the method for machining a cutter provided by this disclosure removes the material by the laser, not by hard crashing. In this disclosure, the removed material is firstly divided into plural smaller material chips, and then these material chips are orderly removed, such that a plenty of machining time can be saved. With the same material to be removed, if the conventional electric erosion or polishing is applied to 100% crash the material to be removed, the corresponding machining time would be much longer.

In comparison to the conventional electric erosion and polishing that would produce a large amount of exhausted liquids, the method for producing the cutter provided by this disclosure that divides the material to be removed into a plurality of material chips for laser cutting can only produce a small amount of solid waste, which is easy to be recycled and presents much more environmentally friendly.

In comparison to another laser method that scans the workpiece to remove the material to be removed layer by layer, and point by point (by melting, vaporizing and eroding), the method for producing the cutter provided by this disclosure is featured in less removal material (by simply vaporizing the material at the laser track), less machining surface, increasing the machining efficiency, and waiving the energy-consuming high-power laser device. Thereupon, the production cost would be significantly reduced without sacrificing the machining efficiency through applying a smaller power laser device (for example, a laser device used in a laser engraving and milling machine). In addition, since the laser method of this disclosure won't result in thermal or mechanical damages to the machined surface, beside the surface finish thereof can be compared to that of the conventional polishing, the machining time is greatly reduced, and the machining efficiency is significantly enhanced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
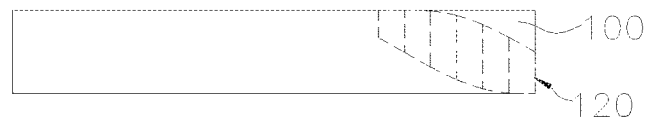
FIG. 1 is a schematic view showing an embodiment of workpiece whose material to be removed is divided into a plurality of material chips in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Currently, it is well known that the laser has been widely applied in machining, including laser cutting, laser engraving, laser drilling, and so on. In particular, the laser cutting and the laser drilling are mainly applied to machine steel plates and steel pipes, in which the laser can completely cut down the workpiece; i.e., a penetration process. On the other hand, the laser engraving is mainly applied to form patterns on a metal surface; i.e., a non-penetrative machining. Since the laser can only "eat" the material layer by layer, and point by point, by melting, vaporizing and thus eroding the material, thus the associated machining efficiency is poor, and the machining depth is short. Hence, in this disclosure, a non-penetrative high-efficiency laser machining method is provided.

Figure 2:
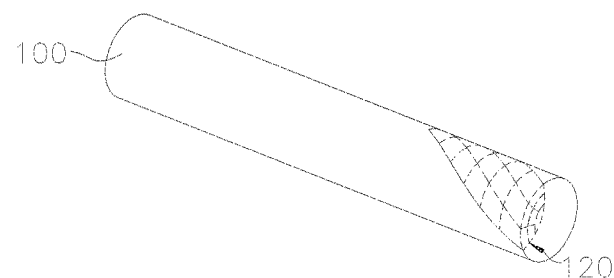
FIG. 2 is a schematic view showing another embodiment of workpiece whose material to be removed is divided into a plurality of material chips in accordance with this disclosure.
Figure 3:
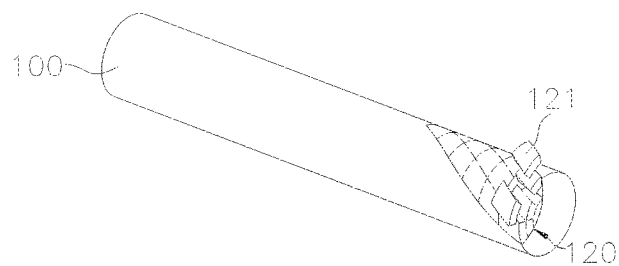
FIG. 3 shows schematically that the material chips of FIG. 2 are removed away from the workpiece by laser cutting.

Refer to FIG. 1 and FIG. 2, where FIG. 1 is a schematic view showing an embodiment of workpiece whose material to be removed is divided into a plurality of material chips in accordance with this disclosure, and FIG. 2 is a schematic view showing another embodiment of workpiece whose material to be removed is divided into a plurality of material chips in accordance with this disclosure. As shown in FIG. 1 and FIG. 2, according to this disclosure, a pattern to be machined and its cutting boundary on the workpiece 100 are firstly determined, so that a corresponding material to be removed 120 can be defined. Then, the material to be removed 120 is divided into a plurality of material chips 121, and from which a machining plan for laser cutting can be organized. For example, an optical path of the laser is directed to the workpiece for guiding the cutting performed along a boundary of each of the material chips 121. Through a proper arrangement, the material chips 121 can be orderly removed, chip by chip, from the workpiece 100. In this disclosure, the laser is applied right at and along the boundary of each of the material chips 121, and thereby the plurality of material chips 121 can be orderly removed from the workpiece 100 (as shown in FIG. 3).

Figure 4:
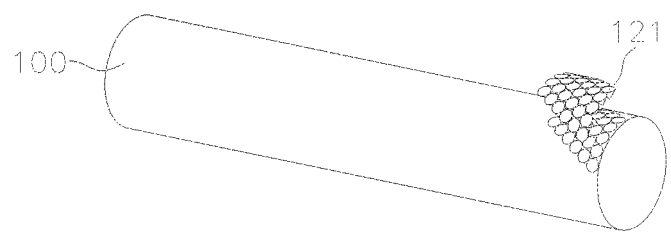
FIG. 4 is a schematic view showing a further embodiment of workpiece whose material to be removed is divided into a plurality of material chips in accordance with this disclosure, and shows schematically that the material chips are removed away from the workpiece by laser cutting.
Figure 5:
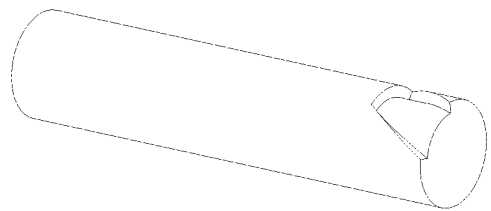
FIG. 5 is a schematic view showing a state of the workpiece of FIG. 4 after the material to be removed is completely removed.

FIG. 4 is a schematic view showing a further embodiment of workpiece whose material to be removed is divided into a plurality of material chips in accordance with this disclosure, and shows schematically that the material chips are removed away from the workpiece by laser cutting. While the laser moves along the cutting boundary between the material to be removed 121 (i.e., any of the material chips) and the workpiece 100, the workpiece is machined in a first direction and a second direction. After the laser cutting, a plurality of tapered material chips 121 can be removed from the workpiece piece by piece, and thus the product with a curved cutting boundary as shown in FIG. 5 can be obtained.

In this embodiment, the machinable depth achievable by the laser is smaller than the instant thickness of the workpiece; i.e., the laser won't penetrate through the workpiece. In another embodiment not shown here, the laser along the optical path can enter the workpiece at one side thereof and leave the workpiece from an opposing side thereof, such that a through hole would be formed at the workpiece. Contrarily, the optical path of the laser in this embodiment is ended up at the workpiece; i.e., entering the workpiece at one side, and never leaving the workpiece from anywhere of the workpiece.

While in applying the laser cutting, the maximum size of the material chips 121 is determined by the machinable depth, along the optical path, of the laser with respect to the workpiece; from which a farthest point in the workpiece that the laser can perform machining can be thus defined. Each of the material chips 121 separated away from the workpiece has a surrounding boundary and a thickness, and the thickness should be less than or equal to the machinable depth of the laser at the workpiece. To different laser devices and different laser beams, the thickness of the material chips would be different, and practically the thickness of the material chip is determined by original machining requirements. In this method, the laser can be a pulse laser or a continuous laser.

With the material chips 121 orderly removed from the workpiece, the pattern to be machined is gradually formulated. In order to promote the automation in machining, the material to be removed 120 and the plurality of material chips 121 can be digitalized so as to form digitalized information. With a three-axis or multi-axis numerical control machine controlled by a computer, the laser focal point, the laser optical path and the workpiece can be included into automation.

Figure 6:
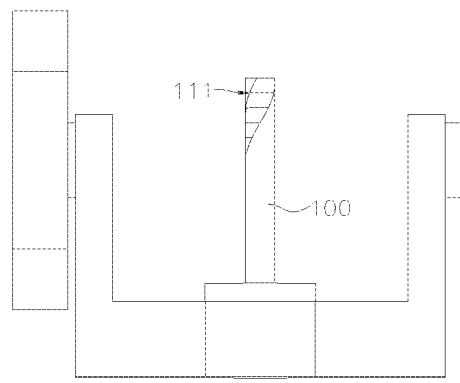
FIG. 6 is a schematic front view of an embodiment of a workpiece in a concave space in accordance with this disclosure.
Figure 7:
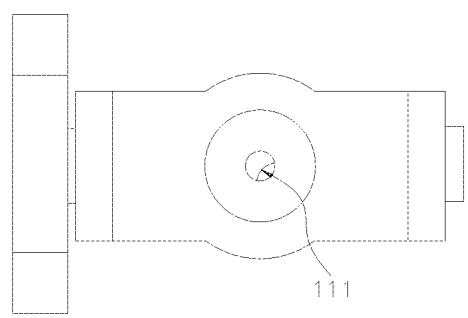
FIG. 7 is a schematic top view of FIG. 6.

Refer to FIG. 6 and FIG. 7; where FIG. 6 is a schematic front view of an embodiment of a workpiece in a concave space in accordance with this disclosure, and FIG. 7 is a schematic top view of FIG. 6. As shown in FIG. 6 and FIG. 7, parameters of a spiral groove of a cutter (such as, but not limited to, a rake angle, a clearance angle, a core thickness, a blade width ratio, a groove-bottom arc, a helix angle and a tool cutting edge inclination) are firstly set up, and then the workpiece is machined to form the spiral groove, including the cutting boundary 111 defining the spiral groove on the workpiece.

In this embodiment, a solid-state laser device is applied to generate pulsed or continuous laser. Relevant solid-state laser device includes the Q-switched pulsed laser, the mode-locked laser, the single-mode laser, the frequency-stabilized laser and the tunable laser.

Figure 8:
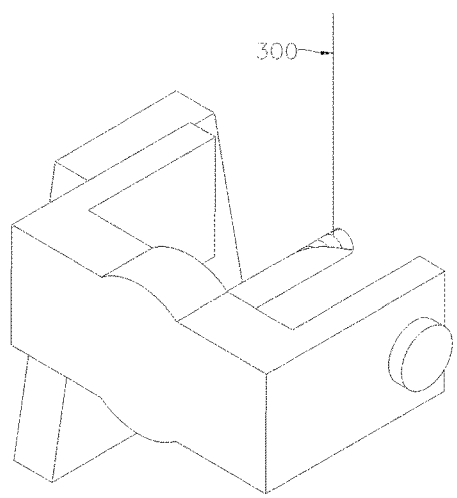
FIG. 8 shows schematically an embodiment of applying a laser to machine the workpiece of FIG. 6.
Figure 9:
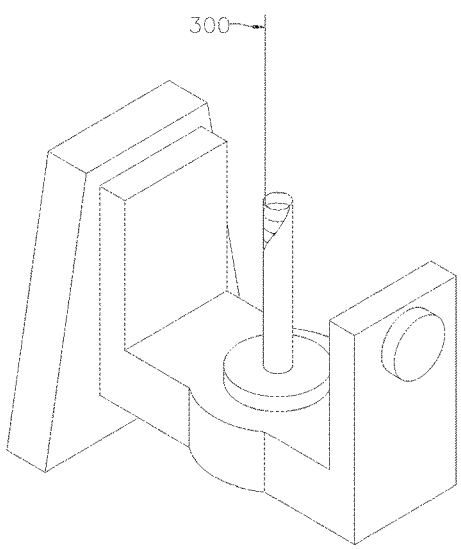
FIG. 9 shows schematically another embodiment of applying the laser to machine the workpiece of FIG. 6.

By adjusting the focal point of the laser 300, then the laser can be applied to machine the workpiece purposely. According to the pattern of the spiral groove, the laser can move along the cutting boundary defining the spiral groove on the workpiece to perform bi-directional (radial and axial directions) cutting upon the workpiece so as to form the spiral groove, in which the material chips are separated from the workpiece chip by chip, as shown in FIG. 8 and FIG. 9.

Figure 10:
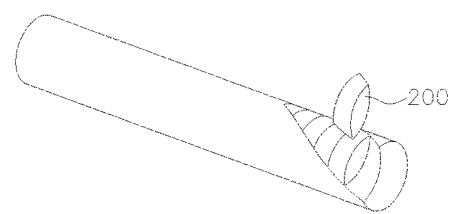
FIG. 10 demonstrates schematically a workpiece and a material chip removed from the workpiece in accordance with this disclosure.

FIG. 10 demonstrates schematically a workpiece and a material chip removed from the workpiece in accordance with this disclosure. As shown, the material chips 200 are kept to be removed from the workpiece orderly as the laser cutting progresses, and synchronously the groove 110 is gradually formed.

Figure 11:
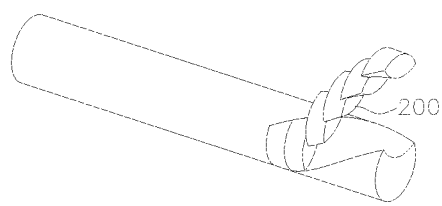
FIG. 11 demonstrates schematically a workpiece and a plurality of material chips removed orderly from the workpiece in accordance with this disclosure.
Figure 12:
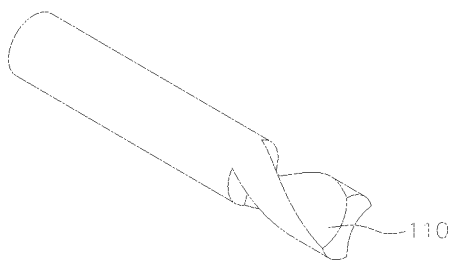
FIG. 12 is a schematic view of a workpiece with a spiral groove machined by the laser method of this disclosure.

FIG. 12 is a schematic view of a workpiece with a spiral groove machined by the laser method of this disclosure. Referring to FIG. 10, FIG. 11 and FIG. 12, after the laser cutting is finished, the pattern of the spiral groove 110 on the workpiece can be obtained.

In the conventional electric erosion or polishing method, the material to be removed is removed 100% by solid crashing, and thus a plenty of machining time would be needed. However, the method for machining a cutter provided by this disclosure removes the material by the laser, in which the removed material is firstly divided into plural smaller material chips, and then these material chips are orderly removed. Thereupon, the machining time can be greatly reduced. Further, In comparison to the conventional electric erosion and polishing that would produce a large amount of exhausted liquids, the method for producing the cutter provided by this disclosure applies the laser for cutting, thus less solid waste would be produced and easy to be recycled, and thus a more friendly environment can be achieved. In addition, in comparison to another laser method that scans the workpiece to remove the material to be removed layer by layer, and point by point by melting and vaporizing (thus to generate gas to pollute the environment), the method for producing the cutter provided by this disclosure is featured in less removal material (by simply vaporizing the material at the laser track), less machining surface, increasing the machining efficiency, and waiving the energy-consuming high-power laser device. Thereupon, the production cost would be significantly reduced without sacrificing the machining efficiency through applying a smaller power laser device (for example, a laser device used in a laser engraving and milling machine). In addition, since the laser method of this disclosure won't result in thermal or mechanical damages to the machined surface, beside the surface finish thereof can be compared to that of the conventional polishing, the machining time is greatly reduced, and the machining efficiency is significantly enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A method for processing a workpiece with a laser, comprising the steps of:
   (a) specifying a pattern to be machined on a workpiece and further specifying a boundary to define the pattern on the workpiece indicative of material to be removed and defining each of the plurality of functional portions on the workpiece;
   (b) dividing the material to be removed into a defined plurality of material chips having laser cutting boundaries, and specifying a machining plan for the laser cutting boundaries for each of the defined plurality of material chips of the pattern; and
   (c) in accordance with the machining plan for laser cutting, applying a laser to cut the workpiece along the laser cutting boundaries to remove orderly, piece-by-piece, each of the defined plurality of material chips from the workpiece;
   wherein the size of the plurality of material chips is determined by a machinable depth of the workpiece with respect to the laser, the machinable depth being the maximum distance that the laser penetrates into the workpiece along an optical path of the laser;
   wherein the machinable depth of the laser is less than a thickness of the workpiece at a location thereof receiving the laser.

2. The method for processing a workpiece with a laser of claim 1, wherein the workpiece is made of one of a PCD, a CBN, a hard metal, a ceramic material and a metallized ceramic material.

3. The method for processing a workpiece with a laser of claim 1, wherein the workpiece is shaped to be one of a sphere, a cylinder, a tapered body, a plate and a block.

4. The method for processing a workpiece with a laser of claim 1, further includes configuring a computer to specify digitalized information for each of the plurality of material chips, and performing the machining plan for laser cutting in accordance with the digitized information.

5. The method for processing a workpiece with a laser of claim 1, wherein the method is applied to manufacture a cutter.

6. The method for processing a workpiece with a laser of claim 1, wherein the method is applied to pattern functional portions of the workpiece.

7. The method for processing a workpiece with a laser of claim 1, wherein the method is applied to pattern functional portions of the workpiece including at least one of a chip-breaker groove, a chip-leading groove, a rake face and a flank face.

8. A method for producing a cutter from a workpiece, comprising the steps of:
  (1) specifying machining parameters for each of a plurality of functional portions of the cutter, further specifying a boundary defining each of the plurality of functional portions on the workpiece, and further specifying a corresponding material to be removed;
  (2) dividing the material to be removed into a defined plurality of material chips having laser cutting boundaries, and specifying a machining plan for the laser cutting boundaries for each of the defined plurality of material chips of the pattern; and
  (3) in accordance with the machining plan for laser cutting, applying a laser to cut the workpiece along the laser cutting boundaries to remove orderly, piece-by-piece, each of the defined plurality of material chips from the workpiece to form a corresponding one of the plurality of functional portion;
  wherein a machinable depth of the laser is less than a thickness of the workpiece at a location thereof receiving the laser.

9. The method for producing a cutter of claim 8, wherein the machining parameters include at least one of a rake angle, a clearance angle, a core thickness, a blade width ratio, a groove-bottom arc, a helix angle and a tool cutting edge inclination.

10. The method for producing a cutter of claim 8, wherein the material to be removed is made of one of a PCD, a CBN, a hard metal, a ceramic material and a metallized ceramic material.

11. The method for producing a cutter of claim 8, wherein the laser is one of a pulse laser and a continuous laser.

12. The method for producing a cutter of claim 8, wherein the method is applied to a three-axis or multi-axis linkage processing equipment controlled by a computer.

13. A method for producing a cutter, applied in a five-axis linkage processing equipment, comprising the steps of:
  (i) specifying parameters of a spiral groove of the cutter, and further specifying a boundary to define the spiral groove on a workpiece indicative of corresponding material to be removed from the workpiece;
  (ii) dividing the material to be removed into a defined plurality of material chips having laser cutting boundaries, and specifying a digitalized machining plan for laser cutting in accordance with the laser cutting boundaries for each of the defined plurality of material chips as a pattern; and
  (iii) in accordance with the digitalized machining plan for laser cutting, configuring a computer to control and apply a laser to cut the workpiece along the laser cutting boundaries to remove orderly, piece-by-piece, each of the defined plurality of material chips from the workpiece to form the spiral groove;
  wherein a machinable depth of the laser is less than a thickness of the workpiece at a location thereof receiving the laser.

14. The method for producing a cutter of claim 13, wherein the parameters include at least a rake angle, a clearance angle, a core thickness, a blade width ratio, a groove-bottom arc, a helix angle and a tool cutting edge inclination.

15. The method for producing a cutter of claim 13, wherein the material to be removed is made of one of a PCD, a CBN, a hard metal, a ceramic material and a metallized ceramic material.

16. The method for producing a cutter of claim 13, wherein the laser is one of a pulse laser and a continuous laser.

* * * * *